April 5, 1938.　　　A. B. CASPER　　　2,112,952
HYDRAULIC SHOCK ABSORBER
Filed March 25, 1937
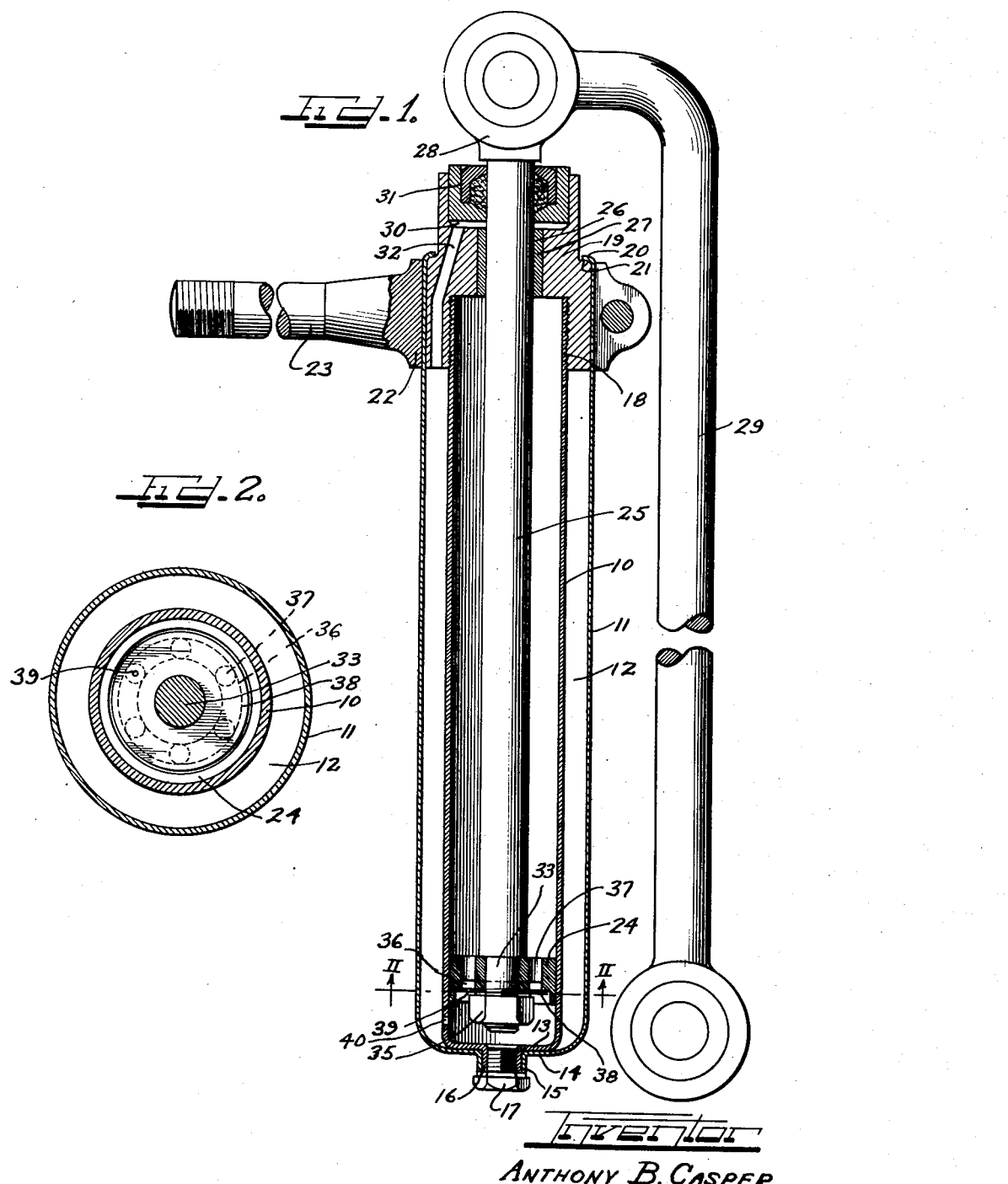
Inventor
ANTHONY B. CASPER.

Patented Apr. 5, 1938

2,112,952

UNITED STATES PATENT OFFICE 2,112,952

HYDRAULIC SHOCK ABSORBER

Anthony B. Casper, Buffalo, N. Y., assignor to Houde Engineering Corporation, Buffalo, N. Y., a corporation of New York Application March 25, 1937, Serial No. 132,895

10 Claims. (Cl. 188—88)

This invention relates to direct acting hydraulic shock absorbers for use in connection with the springs of automotive vehicles, the object being to produce a simple, compact, economically manufactured, and efficient shock absorber of this type.

An important feature of the invention is the simplicity of the shock absorber body structure, the structure comprising inner and outer coaxial elongated cylindrical cups, each drawn integral from sheet metal, the inner cup enclosing cylinder space for a piston, and the space between the inner and outer cups providing a hydraulic fluid reservoir.

A further feature lies in the simplified valving arrangement for controlling the displaced fluid flow between opposite sides of the piston and between the cylinder and the reservoir during compression movement of the vehicle springs and for metering the fluid flow for the desired shock absorbing resistance during rebound movement of the vehicle spring.

The above and other features of the invention are incorporated in the structure shown on the drawing, in which drawing:

Figure 1 is a vertical diametral section of the shock absorber; and

Figure 2 is a section on plane II—II Figure 1.

On the structure shown, the cylinder 10 is in the form of an elongated cylindrical cup preferably drawn integral of sheet metal. An outer frame 11 in the form of an elongated cylindrical cup receives the cylinder cup and is coaxial therewith but spaced therefrom to provide a reservoir chamber 12 for hydraulic fluid. The bottom 13 of the cylinder cup rests on the bottom 14 of the reservoir forming cup, the bottom 14 being extruded to provide a nipple or neck 15 into which extends the nipple or neck 16 extruded from the bottom 13 of the cylinder cup and these nipples may be welded together so as to form a sealed joint.

The cylinder cup nipple 16 may be threaded for reception of a plug 17 for normally closing the cylinder end but which, when removed, permits filling of hydraulic fluid into the cylinder and the reservoir space.

At its outer end the cylinder cup 10 has threaded engagement in the recess 18 in the closure head 19, the outer end of the reservoir cup 11 receiving the lower part of the head and the end portion 20 of the cup being preferably spun around against the shoulder 21 of the head. With this arrangement after the head has been screwed onto the end of the cylinder cup, the deflecting of the end portion 20 of the reservoir cup against the shoulder 21 will cause the reservoir cup to act as a tie to hold the cylinder cup in place and to strengthen it against pressure stresses during operation of the shock absorber.

A supporting fitting 22, which may be in the form of a clamp, receives the end of the cup 11, and surrounds the head 19 and clamps this end securely to the head, and is provided with a laterally extending stud 23 whereby the fitting may be secured to a support such as the chassis of an automotive vehicle, the shock absorber being then supported by the vehicle chassis and extending downwardly from the fitting 22.

Operable within the cylinder is the piston 24 from which the piston rod 25 extends outwardly through the passage 26 in the head, which passage is preferably provided with a bushing 27. A fitting 28 is secured to the outer end of the piston rod and from this fitting an L-shaped connecting link 29 may extend downwardly for connection at its lower end to a support such as the axle of the automotive vehicle.

At its outer end the head 19 has the recess 30 for receiving a suitable packing assembly 31 to surround the piston rod and prevent escape of leakage fluid to the exterior of the shock absorber. Any fluid which may leak out between the piston rod and the bushing 27 will be received in the recess 30 and returned to the upper end of the reservoir space 12 by way of a passage 32 extending through the head 19.

The piston 24 is received on the reduced end 33 of the piston rod and is clamped against the shoulder 34 by a nut 35 engaging the threaded end 33. In the under side of the piston is an annular recess 36 connected by ports 37 with the cylinder space above the piston. A valve 38 in the form of an annular flexible metal plate receives the reduced end 33 of the piston rod and is clamped along its inner edge between the piston and the nut 35 so that it normally engages against the under side of the piston to close the annular recess or channel 36, the valve, however, being flexible so that its outer portion may deflect away from the channel under pressure of fluid flow through the ports 37 from the outer end of the cylinder. The valve has a restricted orifice 39 therethrough in registration with the channel 36. During inward or downward movement of the piston in the cylinder, the fluid pressure will hold the valve against the piston so that the only path for the displaced fluid flow through the piston will be by way of the restricted orifice 39.

Owing to the volumetric differential in the cylinder at opposite sides of the piston on account of the volume of the piston rod as the piston moves inwardly and outwardly, provision must be made for inter-flow of fluid between the reservoir space 12 and the cylinder. I therefore provide a connection 40 between the inner end or bottom of the cylinder and the inner end or bottom of the reservoir space, this restricted bleed passage or orifice being proportioned to give the proper resistance to the inter-fluid flow.

Describing the operation, during bump or compression movement of the vehicle springs the shock absorber will expand, the piston and head 19 moving toward each other. During such relative movement the fluid will exert pressure against the valve 38 to deflect it away from its seat and to expose the annular channel 36 so that the fluid may flow through the ports 37 and the channel and past the unseated valve to the inner end of the cylinder. Owing to the volumetric differential, suction or vacuum will tend to form in the lower end of the cylinder but this suction or vacuum is relieved by flow of hydraulic fluid from the reservoir space through the orifice 40 into the lower end of the cylinder, the resistance of the orifice 40 to this compensating flow of fluid providing the shock absorbing resistance during the bump or compression movement of the vehicle springs.

During rebound movement of the vehicle springs, the shock absorber will contract, the piston and inner end of the cylinder moving toward each other. The pressure against the valve 38 will seat the valve for exposure only of the restricted metering orifice 39 through which the fluid displaced from the inner end of the cylinder must flow to the outer end of the cylinder. Owing to the volumetric differential, the outer end of the cylinder will be unable to receive all of the fluid displaced from the inner end thereof and the surplus fluid will flow through the orifice 40 into the reservoir space, the resistance to flow through the restricted orifice 39 determining the shock absorber resistance or action during rebound movement of the vehicle spring. The resistance to fluid flow of the orifice 40 is less than that of the orifice 39, its size being such that it will provide sufficient resistance to flow from the reservoir into the cylinder during expansion of the shock absorber for sufficiently retarding and absorbing the bump or compression movement of the vehicle springs, while during the rebound movement of the springs the surplus fluid may flow comparatively easy from the inner end of the cylinder into the reservoir.

Through the passage 40 the fluid will flow from the reservoir into the cylinder to keep the cylinder at all times filled with fluid. When the plug 17 is removed for originally filling or for replenishing the shock absorber, the fluid flows into the cylinder and through the port passage 40 into the reservoir.

I have shown a practical embodiment of the various features of my invention but I do not desire to be limited to the exact construction and arrangement shown and described as changes and modifications may be made without departing from the scope of the invention.

I claim as follows:

1. In a direct acting hydraulic shock absorber, a cylinder in the form of an elongated integral cylindrical cup, an outer elongated integral sheet metal cup receiving the cylinder cup concentric therewith but spaced therefrom to provide a reservoir space for hydraulic fluid, a head closing the outer ends of said cups, a piston within the cylinder and a piston rod extending therefrom to the exterior through said head, valve means on the piston for controlling the fluid flow from one side of the piston to the other during relative movement between the piston and cylinder, and a connection between the cylinder and reservoir for the interflow of fluid.

2. In a direct acting hydraulic shock absorber, a cylinder in the form of an elongated integral cylindrical sheet metal cup, a closure head for the outer end of the cylinder, a piston within the cylinder and a piston rod extending therefrom through said head, valve means for controlling the flow of displaced fluid from one side of the piston to the other, the bottom of said cylinder being extruded to form a filler opening surrounding a nipple, and a closure plug for said opening.

3. In a direct acting hydraulic shock absorber, an outer elongated integral cylindrical sheet metal cup, an inner elongated integral cylindrical sheet metal cup, the bottoms of said cups engaging and said cups being spaced apart to provide an annular reservoir space, the inner cup forming a cylinder, a piston in said cylinder, a closure head for the outer ends of said cups, a piston rod extending from the piston through said closure head, valve means for controlling the flow of displaced fluid from one side of the piston to the other, and a connection between the cylinder cup and the reservoir space for inter-flow of fluid.

4. In a direct acting hydraulic shock absorber, an outer elongated integral cylindrical sheet metal cup, an inner elongated integral cylindrical sheet metal cup, the bottoms of said cups engaging and said cups being spaced apart to provide an annular reservoir space, the inner cup forming a cylinder, a piston in said cylinder, a closure head for the outer ends of said cups, a piston rod extending from the piston through said closure head, valve means for controlling the flow of displaced fluid from one side of the piston to the other, a connection between the cylinder cup and the reservoir space for inter-flow of fluid, said cup bottoms having nipples extruded therefrom surrounding a filler opening for hydraulic fluid, and closure means for said opening.

5. In a shock absorber of the direct acting type, a cylinder having a closure head at its outer end, a reservoir having a restricted connection with said cylinder adjacent to its inner end, a piston operable in said cylinder between said head and said restricted connection and having means providing for a comparatively free flow of fluid past the piston on movement of the same toward said head and a more restricted flow past the piston on movement of the same toward said connection.

6. In a direct acting shock absorber, a cylinder having a closure head at its outer end, a reservoir and a connection therefrom to the inner end of said cylinder, a piston operable in said cylinder between said head and said connection and having a piston rod extending therefrom through said head, said piston having ports therethrough, a valve on said piston in the form of an annular flexible disc clamped at its inner portion to the piston with its outer portion normally overlying said ports to prevent flow therethrough, said valve having a restricted orifice therethrough registering with said ports, said valve being arranged to flex to expose said ports during movement of the piston toward said head and to close said ports and to present only its restricted orifice for flow from one side of the piston to the other during movement of said piston toward said connection, said connection being restricted so as to resist flow from the reservoir to the cylinder during movement of the piston toward said head.

7. In a direct acting hydraulic shock absorber, an inner cylindrical cup forming a cylinder, an outer cylindrical cup spaced from the inner cup to provide hydraulic fluid reservoir space, a closure head receiving the outer end of the cylinder cup and being surrounded by the outer end of the outer cup, a clamp receiving said head and the end of the outer cup for clamping said cup end to the head and said clamp being adapted for attachment to a support, a piston within the cylinder cup and a piston rod extending therefrom through said head, and means for connecting the outer end of the piston rod with a support.

8. In a direct acting hydraulic shock absorber, an inner cup forming a cylinder, an outer cup receiving the inner cup and spaced therefrom to provide hydraulic fluid reservoir space, a closure for the outer ends of said cups, a piston within the cylinder cup and a piston rod extending therefrom through said closure, a clamp surrounding the outer ends of said cups and said closure and being adapted for attachment to a support, and means for connecting the outer end of the piston rod with a support.

9. In a direct acting hydraulic shock absorber, an inner cylindrical integral sheet metal cup forming a cylinder, an outer integral sheet metal cup receiving said inner cup, closure means for the outer ends of said cups, a piston operable in said cylinder and having a piston rod extending therefrom through said closure, the bottom of one of said cups having an opening therethrough and the bottom of the other cup being extruded to provide a nipple extending through said opening whereby to hold said cups in alignment and to provide a fluid filler passage.

10. In a direct acting hydraulic shock absorber, an inner cylindrical integral sheet metal cup forming a cylinder, an outer integral sheet metal cup receiving said inner cup and spaced therefrom to provide reservoir space for hydraulic fluid, means connecting said space with said cylinder, closure means for the outer ends of said cups, a piston operable within said cylinder and having a piston rod extending therefrom through said closure, the bottom of one of said cups having a passageway and the bottom of the other cup being extruded to form a nipple extending through said passageway for holding said cups in alignment and for providing a filler opening for hydraulic fluid.

ANTHONY B. CASPER.